(12) United States Patent
Cosby et al.

(10) Patent No.: US 9,909,429 B2
(45) Date of Patent: Mar. 6, 2018

(54) LIGHTWEIGHT BLADE FOR GAS TURBINE ENGINE

(71) Applicant: UNITED TECHNOLOGIES CORPORATION, Hartford, CT (US)

(72) Inventors: James Cosby, Glastonbury, CT (US); Kwan Hui, Manchester, CT (US); Michael A. Weisse, Tolland, CT (US)

(73) Assignee: United Technologies Corporation, Farmington, CT (US)

(*) Notice: Subject to any disclaimer, the term of this patent is extended or adjusted under 35 U.S.C. 154(b) by 259 days.

(21) Appl. No.: 14/774,895

(22) PCT Filed: Mar. 26, 2014

(86) PCT No.: PCT/US2014/031818
§ 371 (c)(1),
(2) Date: Sep. 11, 2015

(87) PCT Pub. No.: WO2014/204542
PCT Pub. Date: Dec. 24, 2014

(65) Prior Publication Data
US 2016/0040541 A1    Feb. 11, 2016

Related U.S. Application Data

(60) Provisional application No. 61/806,957, filed on Apr. 1, 2013.

(51) Int. Cl.
*F01D 5/30* (2006.01)
*F01D 5/14* (2006.01)
(Continued)

(52) U.S. Cl.
CPC ............ *F01D 5/3007* (2013.01); *F01D 5/12* (2013.01); *F01D 5/141* (2013.01); *F01D 5/28* (2013.01);
(Continued)

(58) Field of Classification Search
CPC .......... F01D 5/3007; F01D 5/12; F01D 5/141; F01D 5/28; F01D 5/30; F01D 5/3023;
(Continued)

(56) References Cited

U.S. PATENT DOCUMENTS 2,847,187 A * 8/1958 Murphy .................. F01D 5/323
29/451
2,861,775 A   11/1958 Whitehead
(Continued)

FOREIGN PATENT DOCUMENTS

FR        2659688 A1    9/1991

OTHER PUBLICATIONS

Spplementary European Search Report for European Application No. 14814372.0 dated Apr. 21, 2016.
(Continued)

*Primary Examiner* — Woody Lee, Jr.
*Assistant Examiner* — Brian Delrue
(74) *Attorney, Agent, or Firm* — Carlson, Gaskey & Olds, P.C.

(57) ABSTRACT

A blade for use in a gas turbine engine has an airfoil and a dovetail. The airfoil extends radially outwardly of the dovetail. An inner surface of the dovetail includes a slot extending along a length of the dovetail between a leading edge and a trailing edge. A rotor and a gas turbine engine are also disclose.

20 Claims, 3 Drawing Sheets

(51) Int. Cl.
*F01D 5/28* (2006.01)
*F01D 5/12* (2006.01)

(52) U.S. Cl.
CPC ............... *F01D 5/30* (2013.01); *F01D 5/303* (2013.01); *F01D 5/3023* (2013.01); *F01D 5/3038* (2013.01); *F01D 5/3053* (2013.01); *Y02T 50/671* (2013.01); *Y02T 50/673* (2013.01)

(58) Field of Classification Search
CPC ...... F01D 5/303; F01D 5/3038; F01D 5/3053; Y02T 50/671; Y02T 50/673
USPC ...................................................... 416/219 R
See application file for complete search history.

(56) References Cited

U.S. PATENT DOCUMENTS

| | | | | |
|---|---|---|---|---|
| 4,022,545 A * | 5/1977 | Shank | ........................ | F01D 5/26 416/135 |
| 4,451,205 A * | 5/1984 | Honda | ...................... | F01D 5/22 416/193 A |
| 5,100,292 A * | 3/1992 | Matula | ...................... | F01D 5/30 416/220 R |
| 5,112,193 A * | 5/1992 | Greer | .................... | F01D 5/3015 416/220 R |
| 5,310,312 A * | 5/1994 | Balfour | ................. | F01D 21/045 416/2 |
| 5,310,317 A | 5/1994 | Bailey et al. | | |
| 5,314,307 A * | 5/1994 | Farmer | ................. | F01D 21/045 416/2 |
| 5,431,542 A * | 7/1995 | Weisse | .................... | F01D 5/323 416/219 R |
| 5,522,702 A * | 6/1996 | Kemsley | ................. | F01D 5/323 416/2 |
| 6,416,280 B1 * | 7/2002 | Forrester | ................. | B64C 11/14 416/219 R |
| 6,457,942 B1 * | 10/2002 | Forrester | ................. | F01D 5/326 416/193 A |
| 6,739,837 B2 * | 5/2004 | Barnette | ............... | F01D 5/3092 416/219 R |
| 6,846,159 B2 * | 1/2005 | Zabawa | .................. | F01D 21/04 416/193 A |
| 7,300,253 B2 * | 11/2007 | Beeck | .................... | F01D 5/3007 416/193 A |
| 7,334,996 B2 * | 2/2008 | Corbin | .................. | F01D 5/3007 416/221 |
| 8,167,566 B2 * | 5/2012 | Howes | .................. | F01D 5/3007 416/219 R |
| 8,246,292 B1 | 8/2012 | Morin et al. | | |
| 8,251,667 B2 * | 8/2012 | Wilson | .................. | F01D 5/3038 416/215 |
| 8,517,688 B2 * | 8/2013 | Joshi | ..................... | F01D 5/3038 416/218 |
| 8,961,141 B2 * | 2/2015 | Anderson | ............... | F01D 5/326 416/203 |
| 9,068,465 B2 * | 6/2015 | Keny | .................... | F01D 5/3038 |
| 9,249,669 B2 * | 2/2016 | Garcia-Crespo | ........ | F01D 5/147 |
| 9,506,356 B2 * | 11/2016 | Loftus | ..................... | G01P 15/18 |
| 2005/0084375 A1 * | 4/2005 | Rodrigues | ................. | F01D 5/14 416/219 R |
| 2005/0260078 A1 * | 11/2005 | Potter | ..................... | F01D 5/282 416/219 R |
| 2007/0020102 A1 * | 1/2007 | Beeck | ................... | F01D 5/3007 416/219 R |
| 2010/0028146 A1 * | 2/2010 | Martin | .................. | F01D 5/3007 415/209.3 |
| 2010/0040472 A1 * | 2/2010 | Read | ..................... | F01D 11/008 416/204 R |
| 2010/0166557 A1 * | 7/2010 | Howes | .................. | F01D 5/3007 416/183 |
| 2010/0189564 A1 * | 7/2010 | Stone | .................... | F01D 5/3092 416/221 |
| 2010/0296936 A1 * | 11/2010 | Wilson | .................. | F01D 5/3038 416/217 |
| 2013/0101422 A1 * | 4/2013 | Bullinger | .............. | F01D 5/3007 416/219 R |
| 2016/0076386 A1 * | 3/2016 | Aiello | ................... | F01D 5/3038 60/805 |
| 2016/0084260 A1 * | 3/2016 | Clarke | .................. | F01D 5/3007 416/147 |
| 2016/0215788 A1 * | 7/2016 | Froebel | ................. | F04D 29/324 |

OTHER PUBLICATIONS

International Search Report from counterpart PCT application PCT/US14/31818, filed Mar. 26, 2014.
International Preliminary Report on Patentability for International Application No. PCT/US2014/031818 dated Oct. 15, 2015.

\* cited by examiner

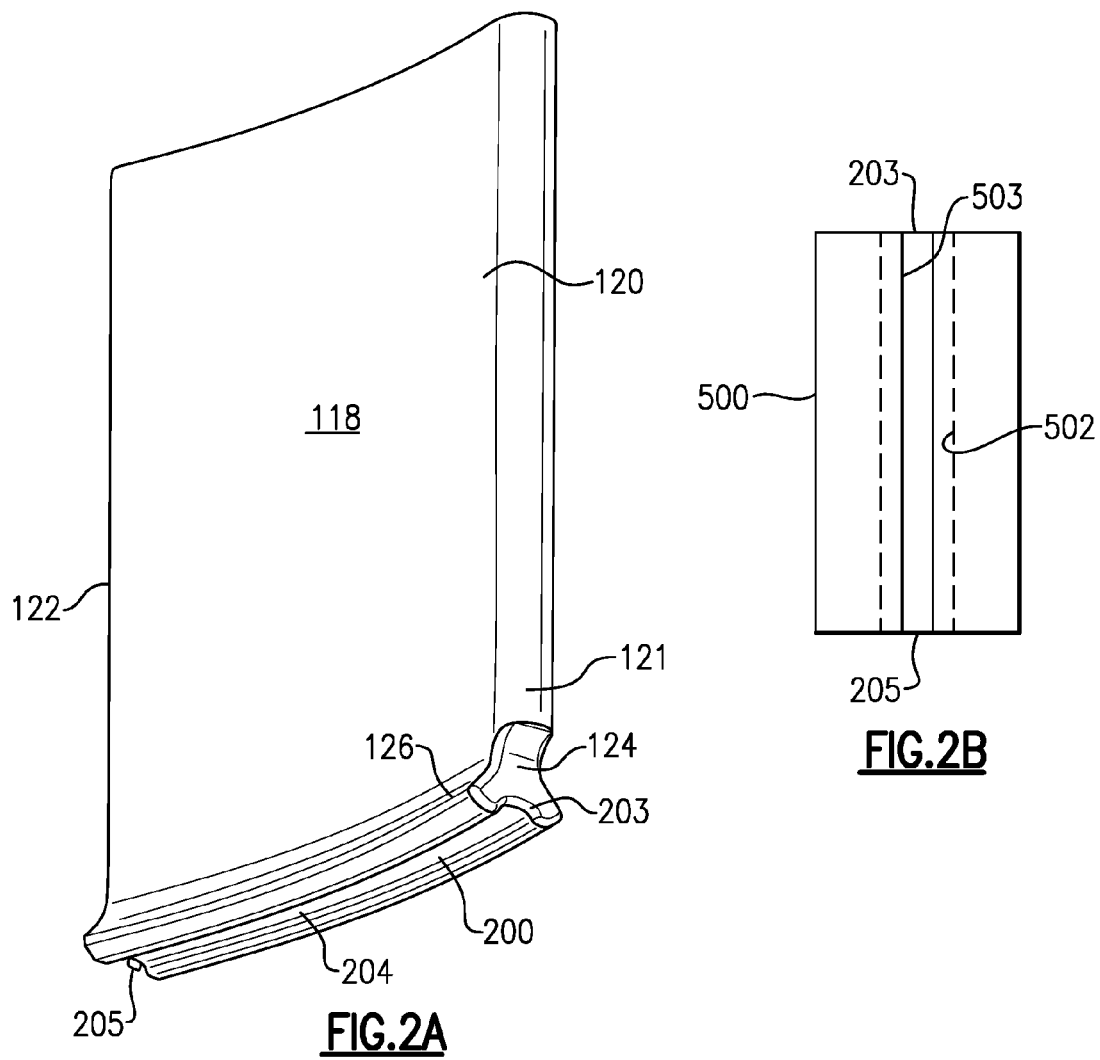
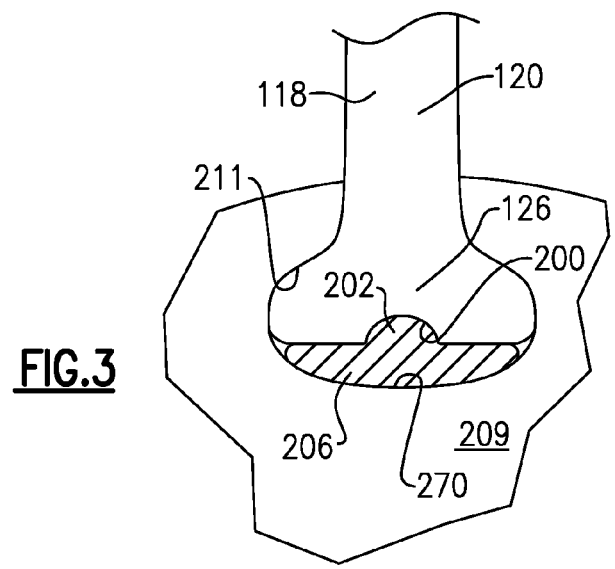

LIGHTWEIGHT BLADE FOR GAS TURBINE ENGINE

CROSS-REFERENCE TO RELATED APPLICATION

This application claims priority to U.S. Provisional Application No. 61/806,957, filed Apr. 1, 2013.

BACKGROUND OF THE INVENTION

This application relates to a weight reduction technique for use in rotating blades in gas turbine engines.

Gas turbine engines are known and, typically, include a fan delivering air into a compressor. The air is compressed and delivered into a combustion section where it is mixed with fuel and ignited. Products of this combustion pass downstream over turbine rotors, driving them to rotate. The turbine rotors, in turn, drive rotors associated with both the compressor and fan sections.

Historically, a single turbine may have driven the fan rotor in a low pressure compressor rotor. However, more recently, a gear reduction has been provided between the fan and the turbine drive. With this gear reduction, the fan can rotate at slower speeds than the turbine or the low pressure compressor.

As the speed of the fan has decreased, there has been an increase in the size of the fan blades. The fan typically also delivers air into a bypass duct where it becomes propulsion for an associated aircraft. The volume of air delivered into the bypass duct has increased relative to the volume of air delivered into the compressor with the enlarged blades.

However, as the blades become larger, their weight also becomes undesirably large.

SUMMARY OF THE INVENTION

In a featured embodiment, a blade for use in a gas turbine engine has an airfoil and a dovetail. The airfoil extends radially outwardly of the dovetail. An inner surface of the dovetail includes a slot extending along a length of the dovetail between a leading edge and a trailing edge.

In another embodiment according to the previous embodiment, the airfoil, the dovetail, and the slot curve between the leading edge and the trailing edge.

In another embodiment according to any of the previous embodiments, the airfoil, the dovetail, and the slot extend generally parallel between the leading edge and the trailing edge.

In another embodiment according to any of the previous embodiments, the dovetail extends circumferentially outwardly from the airfoil beginning at root fillet runouts. A first distance is defined between an opposed pair of the root fillet runouts and a width defined between circumferential edges of the slot at the inner surface. The width is less than the first distance.

In another embodiment according to any of the previous embodiments, the slot at both the leading and trailing edges curve into axial ends of the dovetail.

In another embodiment according to any of the previous embodiments, the slot is formed on a compound curve.

In another embodiment according to any of the previous embodiments, the compound curve includes two circumferentially outer curve portions each formed at a first radius of curvature. A circumferentially central portion is formed of a second radius of curvature with the second radius of curvature being greater than the first radius of curvature.

In another embodiment according to any of the previous embodiments, the blade is for use in a fan.

In another featured embodiment, a rotor has a rotor body with at least one rotor slot for receiving a blade. The blade has an airfoil and a dovetail. The airfoil extends radially outwardly of the dovetail. An inner surface of the dovetail includes a slot extending along a length of the dovetail between a leading edge and a trailing edge.

In another embodiment according to the previous embodiment, the airfoil, the dovetail, and the slot curve between the leading edge and the trailing edge.

In another embodiment according to any of the previous embodiments, the airfoil, the dovetail, and the slot extend generally parallel between the leading edge and the trailing edge.

In another embodiment according to any of the previous embodiments, the dovetail extends circumferentially outwardly from the airfoil beginning at root fillet runouts. A first distance is defined between opposed pairs of the root fillet runouts. A width is defined between circumferential edges of the slot at the inner surface. The width is less than the first distance.

In another embodiment according to any of the previous embodiments, the slot at both the leading and trailing edges curve into axial ends of the dovetail.

In another embodiment according to any of the previous embodiments, the ends of the slot are formed on a compound curve.

In another embodiment according to any of the previous embodiments, the compound curve includes two circumferentially outer curve portions each formed at a first radius of curvature. A circumferentially central portion is formed of a second radius of curvature with the second radius of curvature being greater than the first radius of curvature.

In another embodiment according to any of the previous embodiments, a spacer is positioned within the rotor slot radially inwardly of the dovetail. The spacer has a portion extending radially outwardly and into the slot in the dovetail.

In another embodiment according to any of the previous embodiments, a gas turbine engine has a fan, a compressor and a turbine. At least one of the fan and the compressor has a rotor. The rotor includes a rotor body with at least one rotor slot receiving a blade. The blade has an airfoil and a dovetail. The airfoil extends radially outwardly of the dovetail at an inner surface of the dovetail including a slot extending along a length of the dovetail between a leading edge and a trailing edge.

In another embodiment according to any of the previous embodiments, the airfoil, the dovetail, and the slot curve between the leading edge and the trailing edge.

In another embodiment according to any of the previous embodiments, the airfoil, the dovetail, and the slot extend generally parallel between the leading edge and the trailing edge.

In another embodiment according to any of the previous embodiments, the dovetail extends circumferentially outwardly from the airfoil beginning at root fillet runouts. A first distance is defined between an opposed pair of the root fillet runouts. A width is defined between circumferential edges of the slot at the inner surface. The width is less than the first distance.

In another embodiment according to any of the previous embodiments, ends of the slot at both the leading and trailing edges curve into axial ends of the dovetail.

In another embodiment according to any of the previous embodiments, the blade is for use in a fan.

In another embodiment according to any of the previous embodiments, a spacer is positioned within the rotor slot radially inwardly of the dovetail. The spacer has a portion extending radially outwardly and into the slot in the dovetail.

In another embodiment according to any of the previous embodiments, the turbine drives the fan through a gear reduction.

These and other features may be best understood from the following drawings and specification.

BRIEF DESCRIPTION OF THE DRAWINGS

FIG. 2A shows a blade.
FIG. 2B shows another embodiment.
FIG. 3 is a cross-sectional view through a rotor.

DETAILED DESCRIPTION

Figure 1:
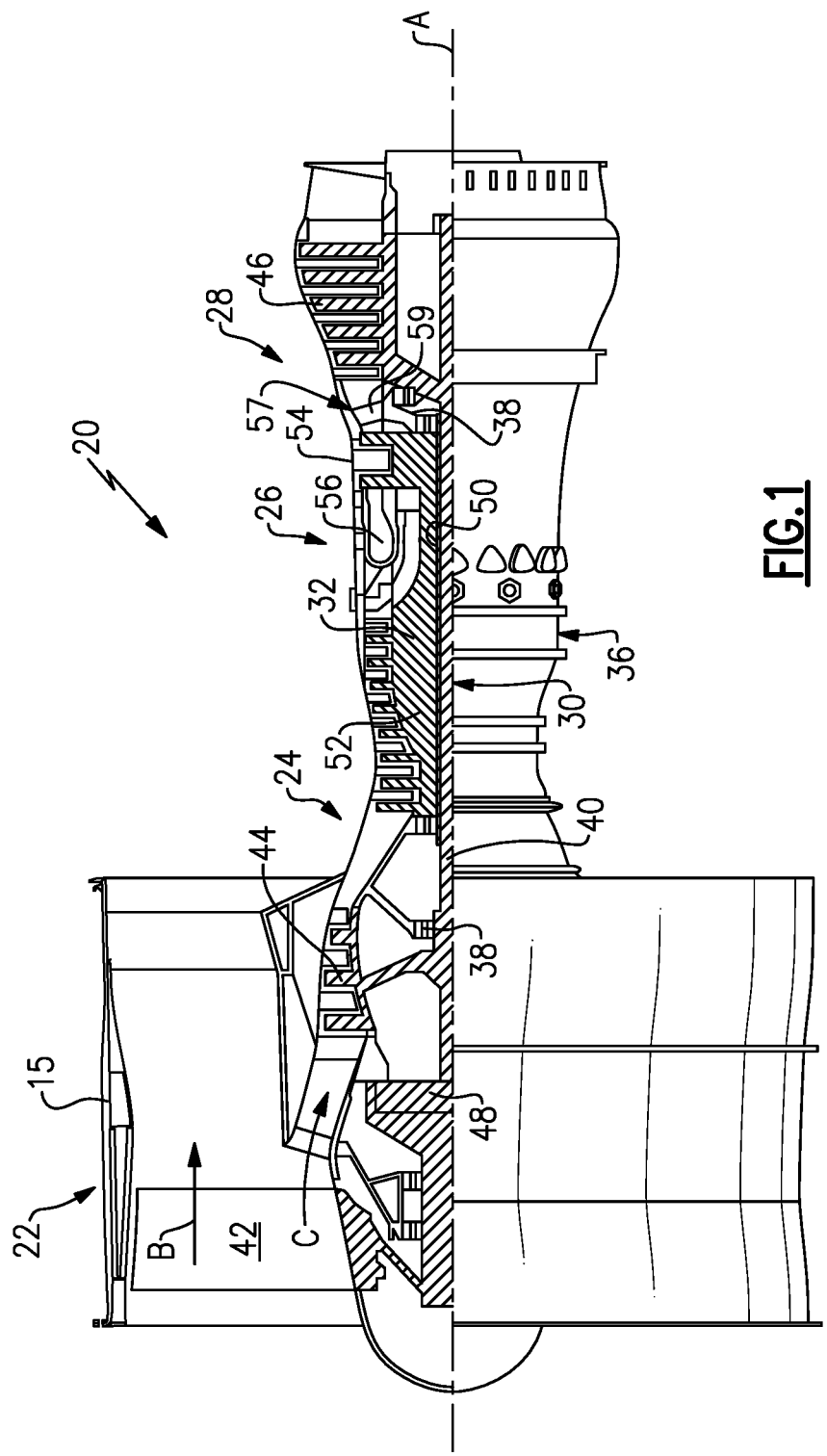
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram}^\circ \text{ R})/(518.7^\circ \text{ R})]^{0.5}$. The "Low corrected fan tip speed" as disclosed herein according to one non-limiting embodiment is less than about 1150 ft/second.

FIG. 2A shows a blade 120 which may be a fan blade. While a fan blade is specifically disclosed, the teachings of this application may extend to other blade locations in the gas turbine engine, such as a compressor.

The blade 120 includes an airfoil 118 extending outwardly of a dovetail 126. As shown in FIG. 3, the dovetail 126 is mounted within a groove 117 in a rotor 209.

The blade 120 has a leading edge 121 with a leading edge cutout 124. Alternately, leading edge 121 may be faired into leading edge surface 124 with no cutout. A trailing edge 122 is found at the opposed side of the airfoil 118. A slot 200 is formed in an underside of the blade and extending from a slot leading edge 203 to a slot trailing edge 205. As can be appreciated, the shape of the slot 200 curves as shown at 204 along this length for a curved dovetail.

In a straight dovetail 500, see FIG. 2B, the shape of slot 503 would also extend in a straight line from slot leading edge 203 to slot trailing edge 205. The slot 503, the dovetail 500, and the airfoil 502 all extend parallel to each other and to axis A.

The slot is formed to reduce the weight of the blade 120. Slot 200 does not affect aerodynamic performance due to the dovetail being below the flowpath. The slot 200 is such that it will not result in scratching of the groove 117 when the blade is inserted or removed.

As show in FIG. 3, a spacer 206 is positioned between a radially inner end 270 of the groove 117 which receives the blade 120. The spacer 206 has a portion 202 which extends upwardly into the slot 200. It should be understood that portion 202 will curve in a similar manner as the slot 200 and as shown in FIG. 2 for a curved dovetail. Alternately, if used in the FIG. 2B embodiment, spacer 206 has no curved portion.

Figure 4:
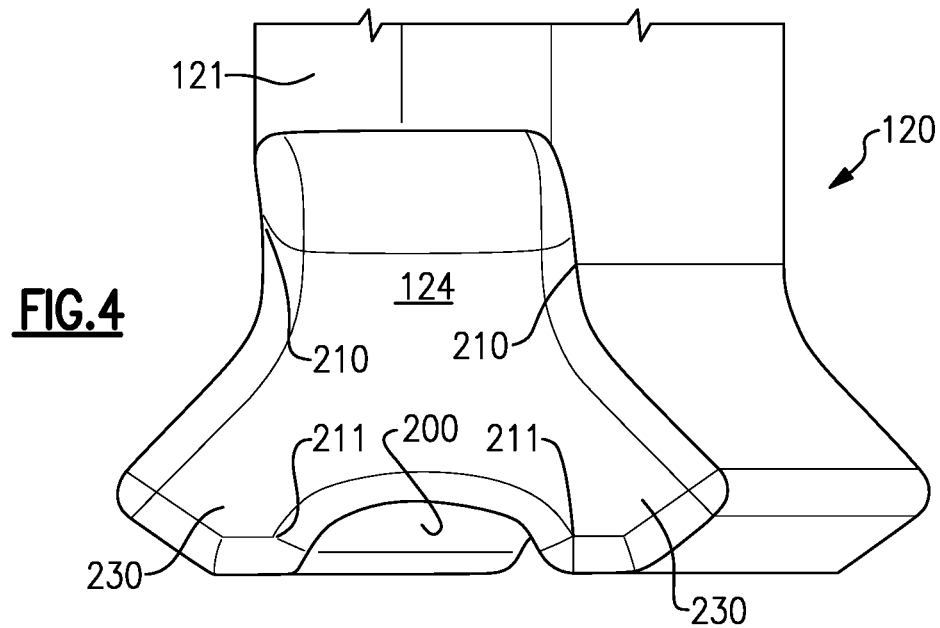
FIG. 4 shows a detail of the blade.

FIG. 4 shows the slot 200 having a width between two circumferentially spaced ends 211 for a curved dovetail. The width of the slot is less than a width between root fillet runouts 210 of the dovetail in order to minimize impact to blade tooth shear capability. Alternately, if the blade tooth shear capability has enough margin, the slot width may be extended past the width between root fillet runouts. As can also be seen in this Figure, there are ear portions 230 of the dovetail formed on each circumferential edge of the slot 200.

For a straight dovetail, the spaced ends 211 and slot 200 would be straight, but otherwise the same as the curved dovetail.

Figure 5:
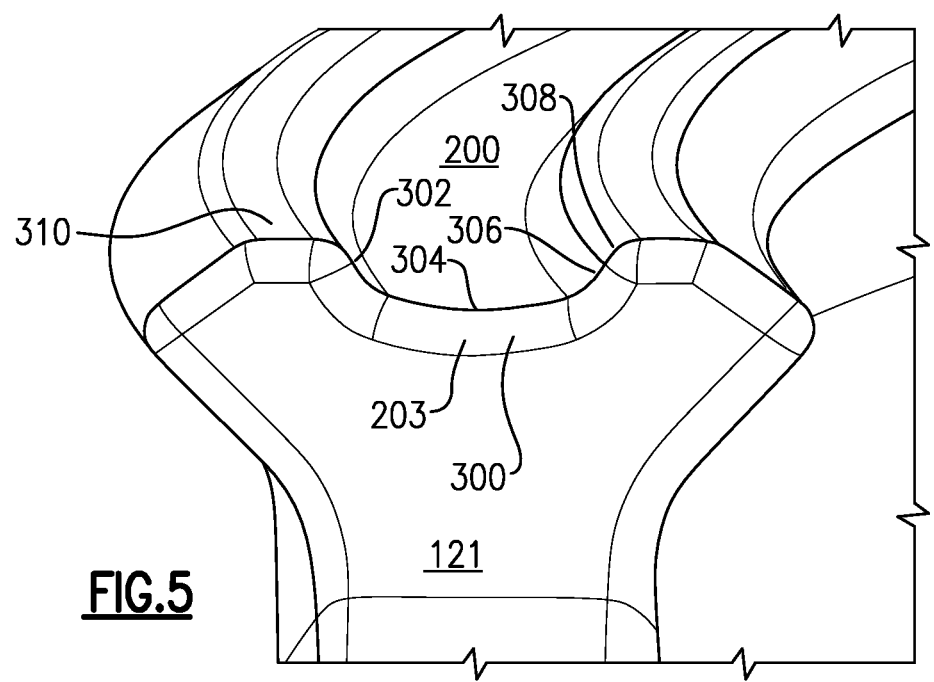
FIG. 5 shows a further detail of the blade.

FIG. 5 shows a further detail. For a curved dovetail, there are rounded edges 300 merging into each of the leading and trailing edges. While the slot leading edge 203 is shown in FIG. 5, this is also true at the trailing edge 205. In one embodiment, there are three fillet portions 302, 304 and 306 merging the slot 200 into corner edges 308 and eventually an inner surface 310. In one embodiment, the fillets 302 and 306 are formed of equal relatively small radii, while the slot 304 has a greater radius of curvature. The use of compound fillets mitigates the extent of stress concentrations. However, other embodiments may consist of a slot composed of just one radius, a slot composed of two radii and a flat area, or only flat areas, or any other combination of radii of varying sizes.

Corner edges 308 are filleted or have break edges in order to prevent scratches to groove 210 during blade installation and removal.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A blade for use in a gas turbine engine comprising:
an airfoil and a dovetail, said airfoil extending radially outwardly of said dovetail;
an inner surface of said dovetail including a slot extending along a length of said dovetail between a leading edge and a trailing edge;
wherein circumferential ends of said slot being formed on a compound curve; and
wherein said compound curve includes two circumferentially outer curve portions each formed at a first radius of curvature, and a circumferentially central portion formed of a second radius of curvature with said second radius of curvature being greater than said first radius of curvature.

2. The blade as set forth in claim 1, wherein said airfoil, said dovetail, and said slot curve between said leading edge and said trailing edge.

3. The gas turbine engine as set forth in claim 1, wherein said airfoil, said dovetail, and said slot extend generally parallel between said leading edge and said trailing edge.

4. The blade as set forth in claim 1, wherein said dovetail extends circumferentially outwardly from said airfoil beginning at root fillet runouts, and a first distance defined between an opposed pair of said root fillet runouts, and a width defined between circumferential edges of said slot at said inner surface, and said width being less than said first distance.

5. The blade as set forth in claim 1, wherein axial ends of said slot at both said leading and trailing edges curve into axial ends of said dovetail.

6. The blade as set forth in claim 1, wherein said blade is for use in a fan.

7. A rotor comprising:
a rotor body having at least one rotor slot for receiving a blade;
the blade having an airfoil and a dovetail, said airfoil extending radially outwardly of said dovetail, an inner surface of said dovetail including a slot extending along a length of said dovetail between a leading edge and a trailing edge;
wherein circumferential ends of said slot being formed on a compound curve; and
wherein said compound curve includes two circumferentially outer curve portions each formed at a first radius of curvature, and a circumferentially central portion formed of second radius of curvature with said second radius of curvature being greater than said first radius of curvature.

8. The rotor as set forth in claim 7, wherein said airfoil, said dovetail, and said slot curve between said leading edge and said trailing edge.

9. The rotor as set forth in claim 7, wherein said airfoil, said dovetail, and said slot extend generally parallel between said leading edge and said trailing edge.

10. The rotor as set forth in claim 7, wherein said dovetail extends circumferentially outwardly from said airfoil beginning at root fillet runouts, and a first distance defined between an opposed pair of said root fillet runouts, and a width defined between circumferential edges of said slot at said inner surface, and said width being less than said first distance.

11. The rotor as set forth in claim 7, wherein axial ends of said slot at both said leading and trailing edges curve into axial ends of said dovetail.

12. The rotor as set forth in claim 7, wherein a spacer is positioned within said rotor slot radially inwardly of said dovetail, and said spacer having a portion extending radially outwardly and into said slot in said dovetail.

13. A gas turbine engine comprising:
a fan, a compressor and a turbine, at least one of said fan and said compressor having a rotor and the rotor including a rotor body having at least one rotor slot receiving a blade;
the blade having an airfoil and a dovetail, said airfoil extending radially outwardly of said dovetail at an inner surface of said dovetail including a slot extending along a length of said dovetail between a leading edge and a trailing edge;
wherein circumferential ends of said slot being formed on a compound curve; and
wherein said compound curve includes two circumferentially outer curve portions each formed at a first radius of curvature, and a circumferentially central portion formed of second radius of curvature with said second radius of curvature being greater than said first radius of curvature.

14. The gas turbine engine as set forth in claim 13, wherein said airfoil, said dovetail, and said slot curve between said leading edge and said trailing edge.

15. The gas turbine engine as set forth in claim 13, wherein said airfoil, said dovetail, and said slot extend generally parallel between said leading edge and said trailing edge.

16. The gas turbine engine as set forth in claim 13, wherein said dovetail extends circumferentially outwardly from said airfoil beginning at root fillet runouts, and a first distance defined between an opposed pair of said root fillet runouts, and a width defined between circumferential edges of said slot at said inner surface, and said width being less than said first distance.

17. The gas turbine engine as set forth in claim 13, wherein axial ends of said slot at both said leading and trailing edges curve into axial ends of said dovetail.

18. The gas turbine engine as set forth in claim 13, wherein said blade is for use in a fan.

19. The gas turbine engine as set forth in claim 13, wherein a spacer is positioned within said rotor slot radially inwardly of said dovetail, and said spacer having a portion extending radially outwardly and into said slot in said dovetail.

20. The gas turbine engine as set forth in claim 17, wherein said turbine drives said fan through a gear reduction.

* * * * *